2 Sheets—Sheet 1.
R. DUTTON.
Mowing Machine.
No. 41,958. Patented March 15, 1864.
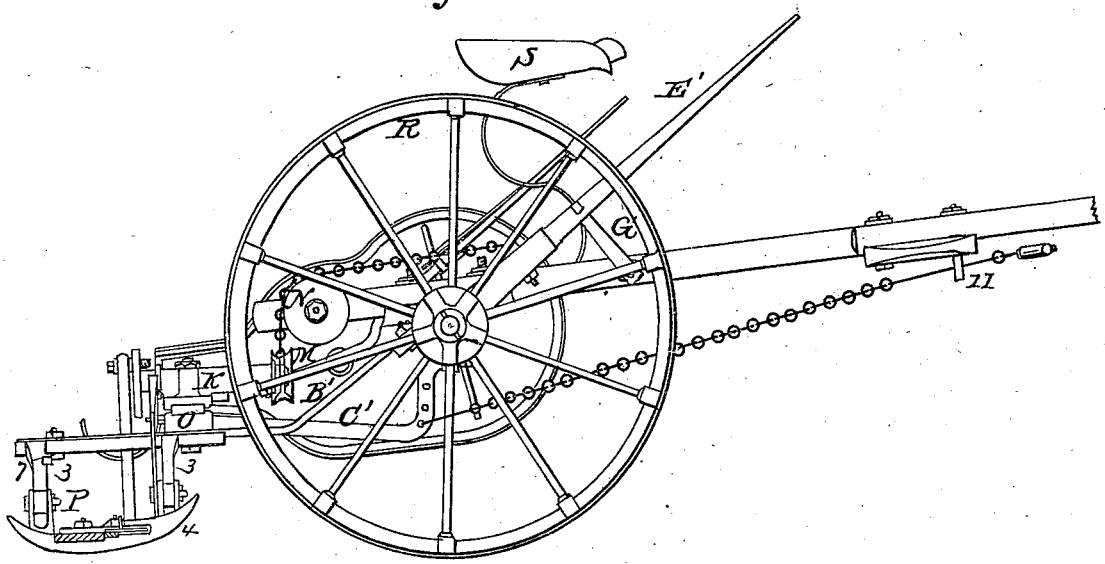
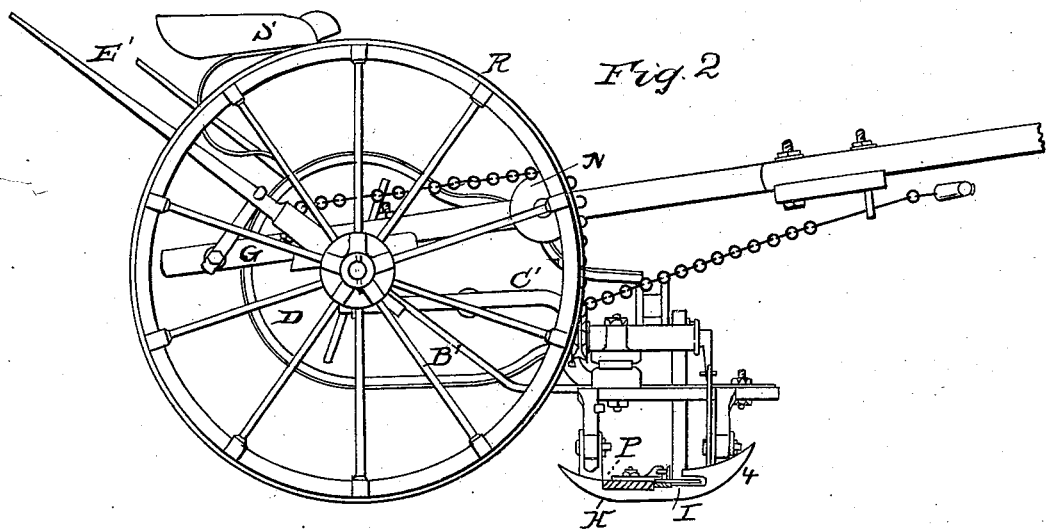
WITNESSES
Alfred Benson
A. G. Benson
INVENTOR
Rufus Dutton R. DUTTON.
Mowing Machine.
No. 41,958.
2 Sheets—Sheet 2.
Patented March 15, 1864.
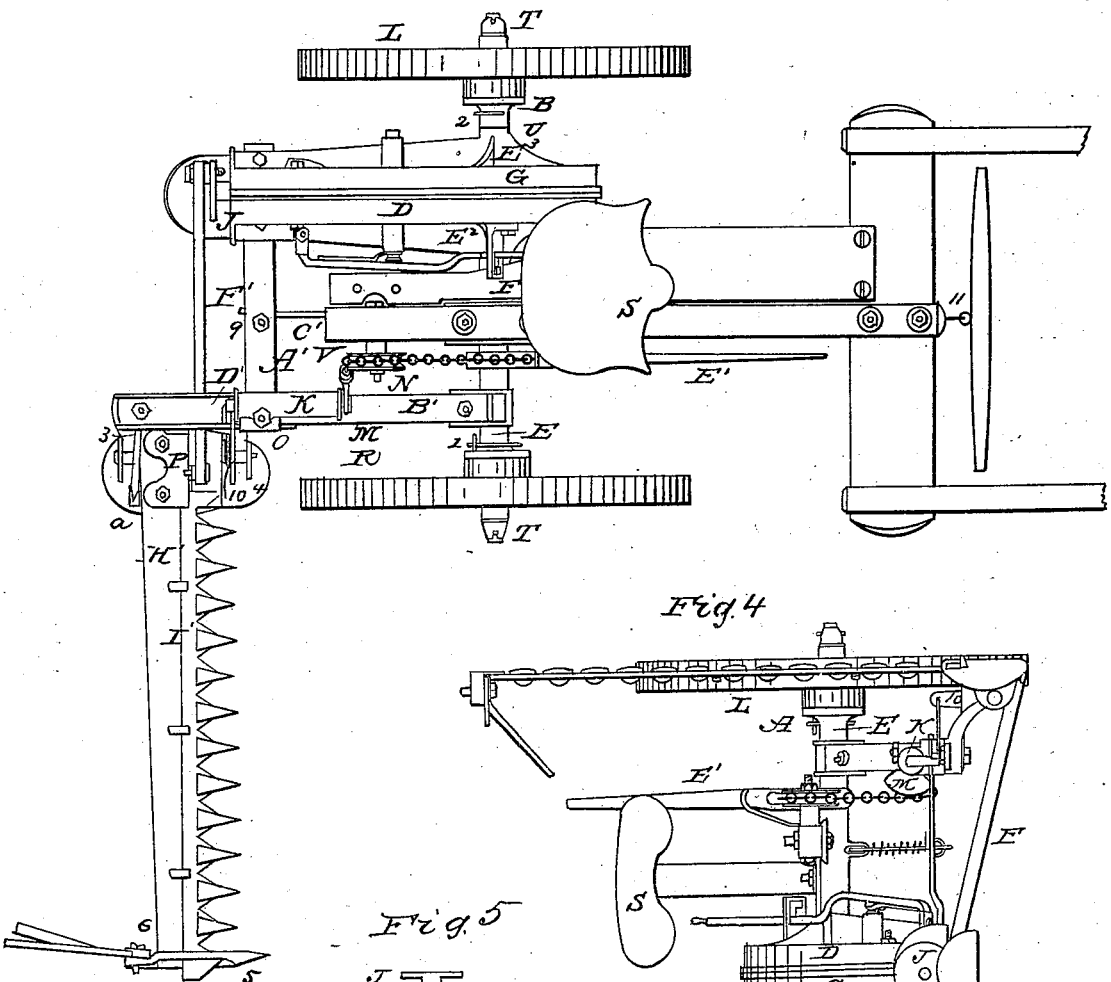
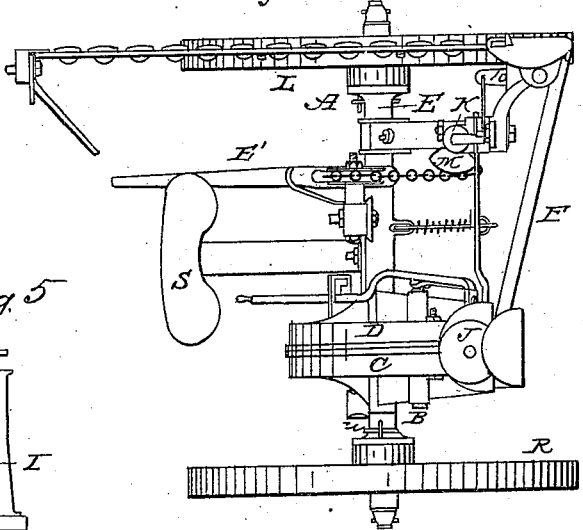
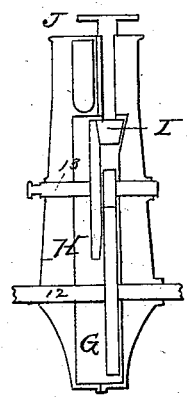
WITNESSES
Alfred Binson
A.G. Benson
INVENTOR
Rufus Dutton.
By his attorney L. Doole.

UNITED STATES PATENT OFFICE.

RUFUS DUTTON, OF BROOKLYN, ASSIGNOR TO HIMSELF AND ANTHONY B. ALLEN, OF NEW YORK, N. Y.

IMPROVEMENT IN MOWING-MACHINES.

Specification forming part of Letters Patent No. 41,958, dated March 15, 1864.

*To all whom it may concern:*

Be it known that I, RUFUS DUTTON, of the city of Brooklyn, and State of New York, have invented a new and Improved Construction of a Mowing-Machine; and I hereby declare that the following is a full and sufficient description thereof, reference being had to the annexed drawings, making a part of this specification, in which—

Figure 1 is a longitudinal elevation taken from the right side of the machine, the cutters being behind the wheels; Fig. 2, longitudinal elevation, the cutters being before the wheels; Fig. 3, top view, cutters being behind the wheels; Fig. 4, rear end view as seen from the ground; Fig. 5, section showing the arrangement of the gearing for transmitting motion to the cutters.

The present machine is specially adapted to mowing grass. The cutters are placed in two-wheeled mowing-machines as ordinarily constructed, at the side and in front or rear of the driving-wheels, when it is called a "front" or "rear" cutting machine. Each position has its advantages, depending on the kind of grass to be cut as well as the surface of the ground traversed. To combine the advantages of each class of machines, I have so constructed the present machine that the cutters may be transferred from the front to the rear of the wheels, and vice versa.

This invention consists in several points of improvement, as given in detail below. The most prominent feature of the invention is so arranging and constructing the parts of the machine as to operate the cutters either before or behind the wheels, as the operator may choose, by shifting the bar and cutters from the one position to the other. Another feature of the machine consists in the construction, arrangement, and reversibility of the draft-rod. Another feature consists in the construction, arrangement, and reversibility of the cross-bar A' to depress the crank end of the connecting-rod when behind the wheels and elevate it when forward of them to preserve the journals at each end of the connecting-rod parallel with each other. Another feature is keeping the line of draft below the axle-tree.

In the accompanying drawings, the same reference letters and numbers refer to the same parts throughout all the figures.

Let R represent the right wheel; L, the left wheel; C, the plain side of the gear-casing. D represents the shifter side of the gear-casing. B' represents the brace-bar, acting as the side piece of the frame on the right side of the machine, and extending from the axle to the shoe. A is the pawl-flange next the inner hub of the right wheel; B, the pawl-flange next the inner hub of the left wheel. E is the brace-hub; E', the hoist-lever; F, the pole-clamp; F', connecting-rod; G, spur-gear, and H spur-pinion and bevel-gear; I, bevel-pinion; J, crank-wheel; K, lifter-sleeve; M, lifter-segment; N, lifter-sheave; O, clamp of brace-bar; 3 3, double-connecting knee-piece; 4, inside shoe; 5, outside shoe; 6, track-board cap; 7, shoe-hook or stop apparatus; P, heel-clamp; S, seat of the driver; T, wheel-washers; U, casing-collar; V, shive-hub sustaining the chain for elevating the cutters; Q, forward clamp-nut of brace-bar B'; 9, draft-iron jaws on the under side of the cross-bar; 10, inside shoe-lever; 11, draft-rod eye-bolt on the under side of the pole; A', cross-bar; C', draft rod or iron extending from the cross-piece to the axle; D', lifter-crank for raising the cutter-bar. G' is a hook for sustaining the hoist-lever.

The first and most prominent feature of this invention consists in so constructing the machine that the cutters can be worked either before or behind the driving-wheels. Supposing the cutters arrranged behind the wheels, the gearing-case C D extends from the axle-tree back to the connecting-rod and crank apparatus, and is bolted to the rear end piece or cross-bar, A', and that again is bolted to the shoe end of the right-side frame-piece or brace-bar B', whose opposite end is bolted to the brace-hub E on the axle. The position of the cutters is changed from the rear to the front of the wheels in the following manner:

*To remove the cutters from rear to front of wheels.*—Remove the left-hand driving-wheel, L, left-hand pawl-flange, B, casing-collar U, plain-side casing C, spur-gear G, and shifter side of casing D. Now put on the casing-collar U and slide it up against the pole-clamp F, reversing the casing sides and spur-gear. First put on the plain side of casing C, then the spur-gear G, then shifter side of casing D. The pawl, flange, and wheel are replaced. Remove the knee-piece 3 3 from the brace-bar B' and place it with the cutter-bar in front. Then take the cross-bar A' and turn it over and bolt it to the under side of the casing, having its upper side down. Remove the brace-bar B' from the brace-hub E. Turn over the brace-hub on the axle-tree, and again bolt the brace-bar to the upper side of the brace-hub. Bolt the knee-piece 3 3 to the brace-bar, with the short bolt in the front hole. Put the lifter-sleeve R on top of the cross-bar, with the cross-bar clamp O between the cross-bar and the brace-bar, and bolt them together, as before. The lifter-crank D' is then reversed in the lifter-sleeve K. Change now the position of the lifter-sheave N and lever-hook G with each other. Attach the lifting-chain to the front side of the lever. Remove the seat to the holes back of the axle-tree. Move forward the draft-rod C and turn it over, putting the back end through the slot in the pole-clamp, and connect what was before the front end to the under side of the cross-bar A'. If the directions have been strictly followed, the cutting apparatus is now arranged to operate in front of the driving-wheels. To change the position of the cutting apparatus from the front to the rear, reverse the operation just described.

The second feature of the invention relates to the means used for elevating and depressing the points of the guards—that is to say, elevating them when behind the wheels and depressing them when before the wheels; for the machine—that is to say, the finger-bar—(working behind the wheels)—passes over inequalities of the ground higher than the plane on which the wheels are traveling. The points of the guards are thereby turned downward, (the axle of the wheels being the center of the arc in which the bar rising and falling vibrates.) The points are thereby liable to catch in the ground. So when the cutting apparatus is placed in front of the wheels and the points are inclined upward it becomes necessary to bring them down nearly to a level with the ground, for the same reason that they must be elevated in the former case. There is therefore danger in running over inequalities in the ground of the two evils above named. To obviate both of these defects and keep the bearings and journals at the two ends of the connecting-rod parallel with each other, so as to avoid all twisting and preserve the right elevation in each position, the offset or double curve in the cross-bar A' is formed. This double curve, when the cutting apparatus is in rear of the driving-wheels, depresses the crank end of the connecting-rod sufficiently near to the horizontal line to secure the easy movement and preserve the parallelism of the journals at the two ends of the connecting-rod. When the cutting apparatus is in front of the wheels, and it becomes necessary to elevate the crank end of the casing, this is accomplished by means of the bend in the cross-bar A' turning said bar bottom side up, so that the part which was lowest before is now most elevated. Thus the cross-bar, by means of the bend, is made to subserve the double purpose of cross-bar in two different positions.

A third feature of the invention relates to the draft-rod and chain, in which the line of draft is taken from the cutting apparatus or from the cross-bar in its immediate vicinity. This part of the invention, while it relieves the horses' necks from the pressure of the pole, it at the same time causes the shoe to bear lightly and uniformly upon the ground over which it is passing. One end of the draft-rod C' being attached to the cross-bar A', the other passes under the axle-tree through the slot in the pole-clamp piece F. This draft-rod has a series of holes in its upright part for the adjustment of the line of draft in the space between it and the whiffletree, which space is occupied by a chain terminating forward in the draft-rod eyebolt 11 and backward in the draft-iron jaw 9 on the under side of the cross-bar A'. The operation of the draft-rod is as follows: When arranged to cut in front of the wheels the action of the gear in machines where the frames are not connected with the pole, but have the shoes rigidly attached to them, causes the shoe to press hard upon the ground, making the draft heavy, and when the machine is drawn by the pole or shaft there is a tendency to pull the wheels up from the ground, diminishing the friction or traction of the wheels against the ground, so as in some cases to prevent the wheels from driving the cutters and cause the wheels to slide along the ground. When the cutters are behind the wheels, the operation of the gearing in the casing having the like tendency to roll the frame on the axle-tree, the heel of the finger-bar is inclined to be raised up from the ground; but by keeping the line of draft below the axle this tendency to lift the finger-bar is counteracted. The line of draft should not only be below the axle-tree, but so directly below it that the axle-tree and its load, by means of an intervening link-rod or other rigid brace, may bear down upon the said draft-rod, so as to control the direction of the line of draft higher or lower, as the case may require. The inequalities of the ground also seriously affect the line of draft. Thus, if the heel of the finger-bar in rear cutting be raised in passing over a small hummock, and there be no controlling-brace between the axle and the draft-rod, the line of draft is too much elevated and too oblique to hold the cutters to the ground, while the brace-link fully accomplishes this result. This brace-link is formed in the present case by bending up the forward end of the draft-rod and attaching it to the axle-tree or to the clamp-piece immediately under it.

Having stated the nature of the invention and the mode of operating the same, what I claim as my invention, and desire to secure by Letters Patent, is—

1. Changing the cutting apparatus from front to rear and from rear to front of the right wheel of the machine by means of detaching and reversing the parts of the gear-casing C D, draft-rod C', and cross-bar A', substantially as set forth in the specification.

2. The bend or offset in the cross-bar A' for depressing the crank end of the casing in rear cutting and elevating the same in front cutting, substantially as set forth.

3. Constructing the draft-rod with a bend at of one its ends, and made reversible to adapt it to front and rear cutting, substantially as and for the purpose set forth.

4. So attaching the line of draft in a mowing-machine as to counteract the tendency of the gear-casing to rotate on the axle, as well as to prevent the finger-bar from rising above the ground in rear cutting and pressing upon the ground in front cutting, substantially as set forth.

RUFUS DUTTON.

Witnesses:
S. W. BALDWIN,
R. D. BUSH.